(12) United States Patent
Downs et al.

(10) Patent No.: US 12,730,045 B2
(45) Date of Patent: Sep. 8, 2026

(54) SUSTAINED LOAD FIXTURE AND METHODS OF PLACING A SPECIMEN IN TENSION

(71) Applicant: The Boeing Company, Arlington, VA (US)

(72) Inventors: Hawken S. Downs, Marysville, WA (US); Brian Scott Kasperson, Snoqualmie, WA (US)

(73) Assignee: The Boeing Company, Arlington, VA (US)

( * ) Notice: Subject to any disclaimer, the term of this patent is extended or adjusted under 35 U.S.C. 154(b) by 341 days.

(21) Appl. No.: 18/520,291

(22) Filed: Nov. 27, 2023

(65) Prior Publication Data

US 2025/0172468 A1 May 29, 2025

(51) Int. Cl.

| | |
|---|---|
| ***G01N 3/14*** | (2006.01) |
| ***G01N 3/04*** | (2006.01) |
| ***G01N 3/08*** | (2006.01) |
| ***G01N 17/00*** | (2006.01) |

(52) U.S. Cl.

CPC ................. *G01N 3/14* (2013.01); *G01N 3/04* (2013.01); *G01N 3/08* (2013.01); *G01N 17/00* (2013.01)

(58) Field of Classification Search

CPC .. G01N 3/04; G01N 3/08; G01N 3/14; G01N 2203/0035; G01N 2203/0003; G01N 2203/0017; G01N 2203/0075; G01N 2203/0252; G01N 2203/0435

See application file for complete search history.

(56) References Cited

U.S. PATENT DOCUMENTS

| | | | | |
|---|---|---|---|---|
| 5,388,464 | A * | 2/1995 | Maddison | G01N 3/04 73/826 |
| 5,798,463 | A | 8/1998 | Doudican et al. | |
| 2010/0251838 | A1 | 10/2010 | Halderman et al. | |

FOREIGN PATENT DOCUMENTS

| | | | |
|---|---|---|---|
| CN | 113834724 A * | 12/2021 | G01N 3/303 |

OTHER PUBLICATIONS

Machine translation of CN 113834724 (Year: 2021).*

Author Unknown, "Tensile Testing," Wikimedia Foundation, Oct. 4, 2023, 6 pages, Wikipedia, accessed Nov. 27, 2023, https://en.wikipedia.org/wiki/Tensile_testing.

Extended European Search Report, dated Mar. 11, 2025, regarding EP Application No. 24201142.7, 11 pages.

* cited by examiner

*Primary Examiner* — Nathaniel J Kolb

(74) *Attorney, Agent, or Firm* — Yee & Associates, P.C.

(57) ABSTRACT

Sustained load fixture and methods of use. The sustained load fixture comprises a force applicator within an outer housing; a first specimen mount secured to the outer housing and configured to hold a first end of a specimen to be loaded; a second specimen mount secured to an inner housing and configured to hold a second end of the specimen to be loaded; and the inner housing movable relative to the outer housing to apply a tension to the specimen through the second specimen mount, the force applicator positioned to apply a force to the inner housing such that the inner housing translates the force from the force applicator into the tension on the specimen.

21 Claims, 10 Drawing Sheets

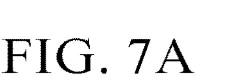

700

START

708 — APPLYING AT LEAST ONE OF A PRIMER OR A TOP COAT ONTO THE OUTER HOUSING AND THE INNER HOUSING PRIOR TO APPLYING THE SUSTAINED TENSION LOAD TO THE SPECIMEN

702 — SECURING THE SPECIMEN ON A FIRST SPECIMEN MOUNT AND A SECOND SPECIMEN MOUNT OF A SUSTAINED LOAD FIXTURE

704 — SECURING AN INNER HOUSING OF THE SUSTAINED LOAD FIXTURE ON A SECOND SPECIMEN MOUNT OF THE SUSTAINED LOAD FIXTURE TO SET A DISTANCE BETWEEN A FAR END OF THE INNER HOUSING AND A FIRST SPECIMEN MOUNT OF THE SUSTAINED LOAD FIXTURE

710 — WHEREIN SECURING THE INNER HOUSING OF THE SUSTAINED LOAD FIXTURE ON THE SECOND SPECIMEN MOUNT COMPRISES ADJUSTING A TORQUE RETENTION NUT CONNECTED TO A THREADED CONNECTOR OF THE SECOND SPECIMEN MOUNT TO SET THE DISTANCE BETWEEN THE FAR END OF THE INNER HOUSING AND THE FIRST SPECIMEN MOUNT

712 — WHEREIN SECURING THE INNER HOUSING OF THE SUSTAINED LOAD FIXTURE COMPRISES SETTING THE DISTANCE TO ESTABLISH THE KNOWN TENSION TO BE APPLIED TO THE SPECIMEN

706 — APPLYING A FORCE TO THE INNER HOUSING USING A FORCE APPLICATOR WITHIN AN OUTER HOUSING OF THE SUSTAINED LOAD FIXTURE TO CHANGE THE DISTANCE BETWEEN THE FAR END OF THE INNER HOUSING AND THE FIRST SPECIMEN MOUNT OF THE SUBSTANCE LOAD FIXTURE

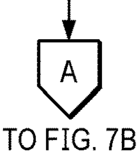

TO FIG. 7B

SUSTAINED LOAD FIXTURE AND METHODS OF PLACING A SPECIMEN IN TENSION

BACKGROUND INFORMATION

1. Field

The present disclosure relates generally to performing tests on specimens and more specifically to placing specimens into tension and load fixtures to place specimens into tension.

2. Background

Currently there is no conventionally available testing equipment for providing a sustained tension load to a specimen. For testing equipment, consistent execution and verifiable, consistent results are desirable.

Therefore, it would be desirable to have a method and apparatus that takes into account at least some of the issues discussed above, as well as other possible issues.

SUMMARY

An embodiment of the present disclosure provides a sustained load fixture. The sustained load fixture comprises a force applicator within an outer housing; a first specimen mount secured to the outer housing and configured to hold a first end of a specimen to be loaded; a second specimen mount secured to an inner housing and configured to hold a second end of the specimen to be loaded; and the inner housing movable relative to the outer housing to apply a tension to the specimen through the second specimen mount, the force applicator positioned to apply a force to the inner housing such that the inner housing translates the force from the force applicator into the tension on the specimen.

Another embodiment of the present disclosure provides a method of applying a sustained tension load to a specimen. The specimen is secured on a first specimen mount and a second specimen mount of a sustained load fixture. An inner housing of the sustained load fixture is secured on a second specimen mount of the sustained load fixture to set a distance between a far end of the inner housing and a first specimen mount of the sustained load fixture. A force is applied to the inner housing using a force applicator within an outer housing of the sustained load fixture to change the distance between the far end of the inner housing and the first specimen mount of the sustained load fixture.

A further embodiment of the present disclosure provides a sustained load fixture. The sustained load fixture comprises a force applicator; an outer housing surrounding the force applicator; and an inner housing within the outer housing and movable relative to the outer housing to place a specimen into tension when the force applicator applies a force to the inner housing, when the specimen is mounted to the outer housing and the inner housing.

A further embodiment of the present disclosure provides a method of applying a sustained load to a specimen. Both ends of the specimen are connected into a sustained load fixture within a load applying machine. The specimen is tension loaded through the sustained load fixture using the load applying machine. The sustained load fixture and the specimen are removed from the load applying machine while maintaining a known tension on the specimen.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 7A and 7B is a flowchart of a method of applying a sustained tension load to a specimen in accordance with an illustrative embodiment;

DETAILED DESCRIPTION

Figure 1:
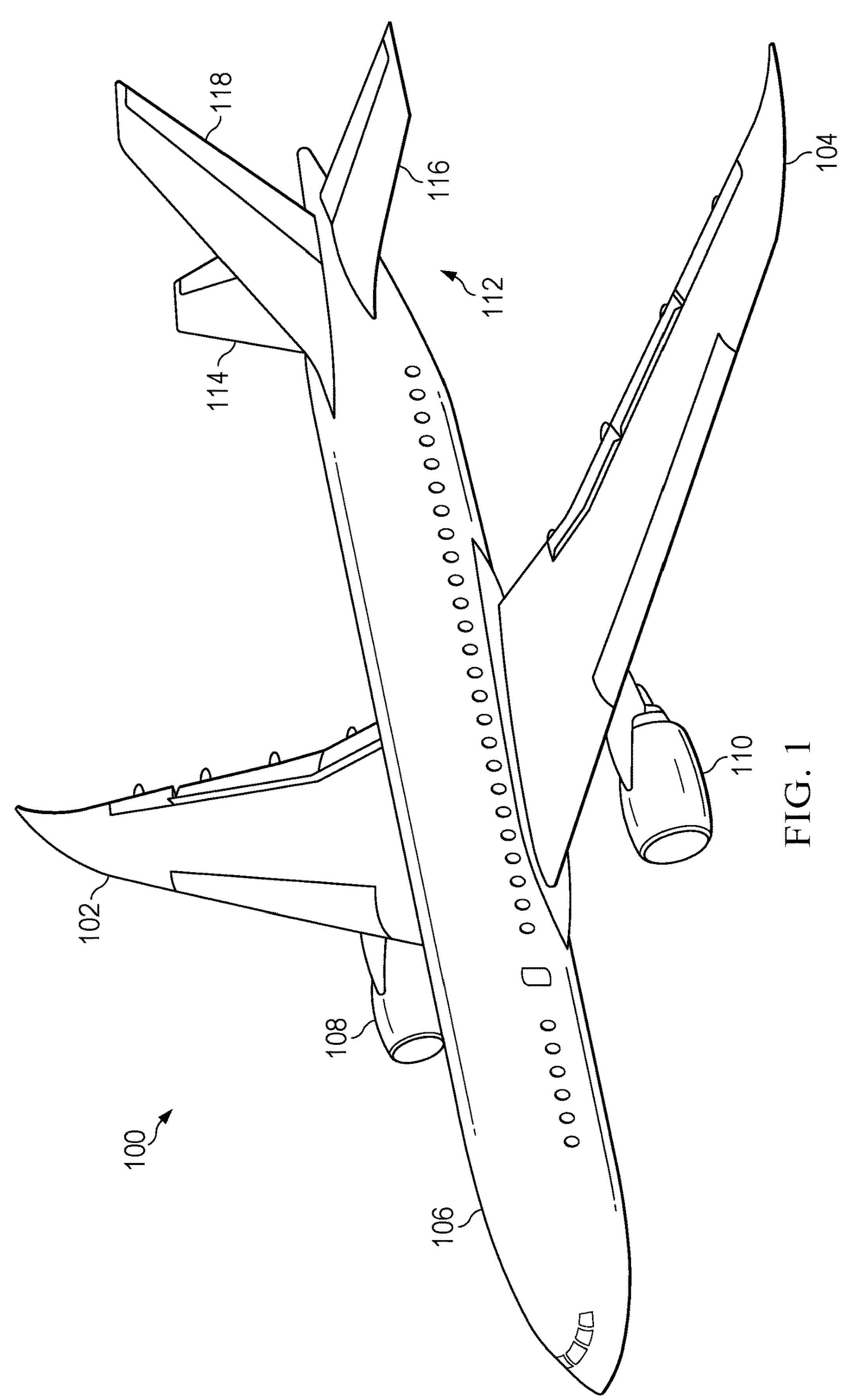
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have materials tested using the sustained load fixture and methods of use of the illustrative examples. A sustained load fixture of the illustrative examples can be used to test materials for any component of aircraft 100, such as wing 102, wing 104, or body 106.

Figure 2:
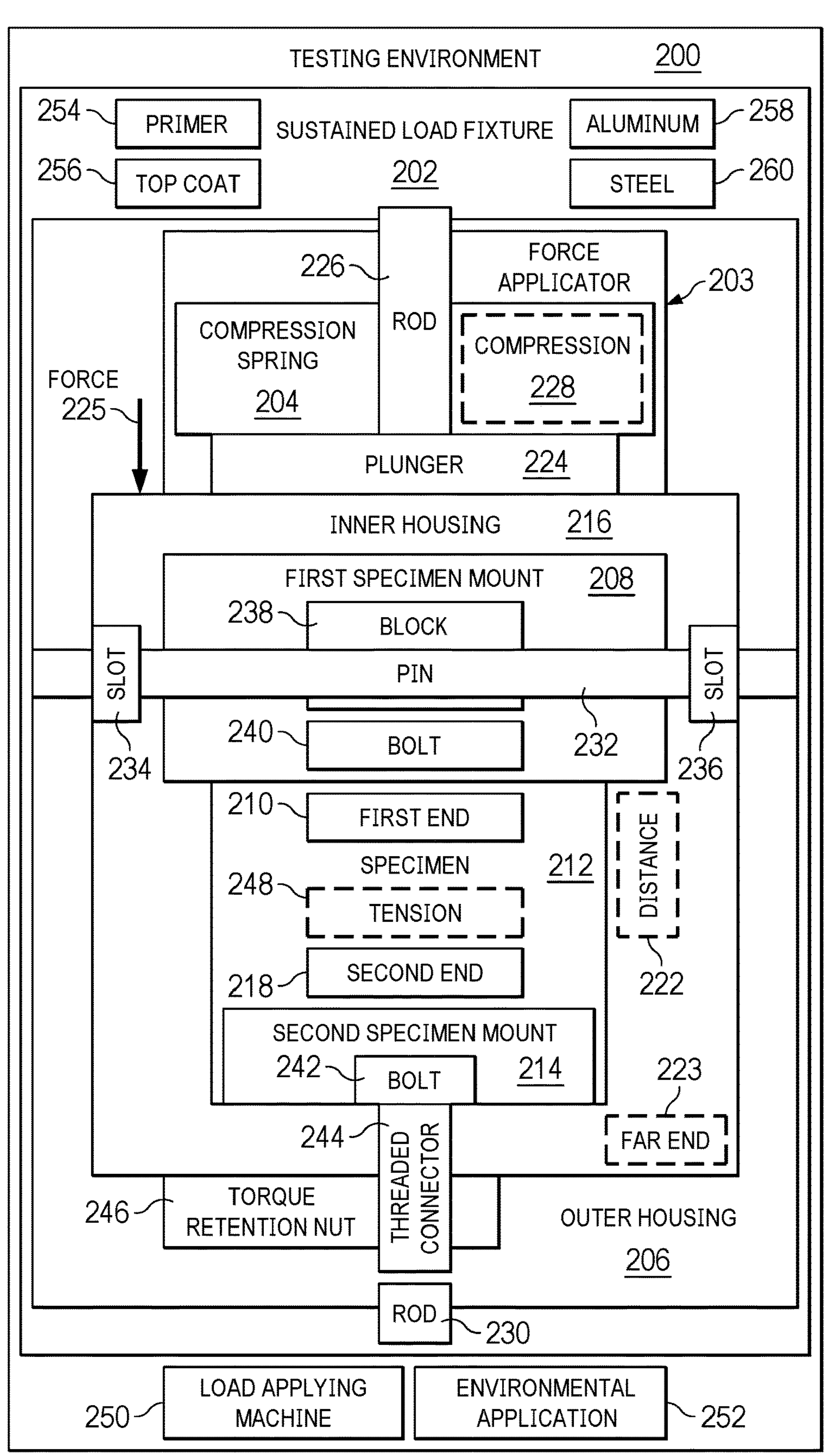
FIG. 2 is an illustration of a block diagram of a testing environment in accordance with an illustrative embodiment.

Turning now to FIG. 2, an illustration of a block diagram of a testing environment is depicted in accordance with an illustrative embodiment. Testing environment 200 comprises sustained load fixture 202 configured to apply tension 248 to specimen 212. Sustained load fixture 202 is configured to maintain tension 248 on specimen 212 as sustained load fixture 202 is moved within testing environment 200.

Sustained load fixture 202 comprises force applicator 203 within outer housing 206, first specimen mount 208 secured to outer housing 206 and configured to hold first end 210 of specimen 212 to be loaded, second specimen mount 214 secured to inner housing 216 and configured to hold second end 218 of specimen 212 to be loaded, and inner housing 216 movable relative to outer housing 206 to apply tension 248 to specimen 212 through second specimen mount 214. Force applicator 203 is positioned to apply a force to inner housing 216 such that inner housing 216 translates the force from force applicator 203 into tension 248 on specimen 212.

Inner housing 216 is movable relative to outer housing 206 to set distance 222 between far end 223 of inner housing 216 and first specimen mount 208. Force applicator 203 is positioned to apply force 225 to inner housing 216 such that specimen 212 loaded in sustained load fixture 202 is placed into tension 248. Tension 248 may also be referred to as a known tension. Tension 248 has a known value based on at least one of a position of inner housing 216 or known force 225 applied by force applicator 203.

Force 225 is applied to inner housing 216 using force applicator 203 within outer housing 206 of sustained load fixture 202 to change distance 222 between far end 223 of inner housing 216 and first specimen mount 208 of sustained load fixture 202. Applying force 225 to inner housing 216 using force applicator 203 applies tension 248 to specimen 212 using second specimen mount 214.

Force applicator 203 takes any desirable form to apply a compression force to inner housing 216. Force applicator 203 can be selected based on at least one of a desired cost, a desired complexity, or a desired ability to withstand environmental conditions such that force applicator 203 is operable after exposure to at least one of heat, salt, water, or other environmental condition. In some illustrative examples, force applicator 203 comprises at least one of compression spring 204, an inflatable bladder, or a hydraulic actuator.

In some illustrative examples, outer housing 206 surrounds force applicator 203. When outer housing 206 surrounds force applicator 203, outer housing 206 isolates force applicator 203 from human operators.

In some illustrative examples, force applicator 203 comprises compression spring 204 and outer housing 206 surrounds compression spring 204. By surrounding compression spring 204, outer housing 206 eliminates pinch points. Outer housing 206 prevents undesirable affects due to failure of compression spring 204.

In some illustrative examples, plunger 224 is present to apply a load to compression spring 204. In some illustrative examples, plunger 224 is present within outer housing 206. Rod 226 is connected to plunger 224 and extends through outer housing 206. Plunger 224 is configured to compress compression spring 204 against outer housing 206. Pulling rod 226 connected to plunger 224 places compression spring 204 into compression 228.

Rod 230 is connected to an opposite end of outer housing 206 than plunger 224. Rod 230 can be used to secure sustained load fixture 202 within load applying machine 250. In some illustrative examples, rod 226 connected to plunger 224 and rod 230 connected to the opposite end of outer housing 206 are configured to interface with load applying machine 250. In some illustrative examples, load applying machine 250 is configured to place compression spring 204 into compression 228. Sustained load fixture 202 is configured to maintain tension 248 on specimen 212 when sustained load fixture 202 is removed from load applying machine 250.

Load applying machine 250 can take any desirable form. In some illustrative examples, load applying machine 250 is designed to hold sustained load fixture 202 and to apply compression 228 to compression spring 204.

No additional fixturing is required to load specimen 212 into sustained load fixture 202. Only one specimen, specimen 212, is loaded into sustained load fixture 202, which ensures accurate loading. Compression spring 204 is fully encased to reduce or eliminate pinch point risks. Only one nut, torque retention nut 246 is used to tighten down specimen 212 to receive load. In some illustrative examples, specimen 212 is loaded into inner housing 216 and then inner housing 216 is placed into outer housing 206 with specimen 212. In some illustrative examples, specimen 212 is loaded into inner housing 216 while inner housing 216 is positioned inside outer housing 206.

Sustained load fixture 202 provides a stable, one piece tension load. The operation of sustained load fixture 202 comprises a one-step load and unload procedure from load applying machine 250. In some illustrative examples, sustained load fixture 202 with specimen 212 is placed into load applying machine 250. Load applying machine 250 activates force applicator 203 to place specimen 212 into tension 248. Afterwards, sustained load fixture 202 is removed from load applying machine 250 while specimen 212 is still under tension 248.

Load applying machine 250 can be used to apply loads to specimens in multiple sustained load fixtures. The efficiency of load applying machine 250 is increased by the ease and speed of generating tension 248 in specimen 212. Load applying machine 250 is not exposed to environmental application 252. Due to the insertion and removal of sustained load fixture 202 from load applying machine 250, sustained load fixture 202 can be referred to as a "cartridge."

Inner housing 216 comprises slots, slot 234 and slot 236. First specimen mount 208 comprises pin 232 extending through the slots in inner housing 216 such that inner housing 216 is movable relative to pin 232. First specimen mount 208 comprises pin 232 configured to secure specimen 212 to outer housing 206 and controls the movement of inner housing 216.

First specimen mount 208 comprises bolt 240 extending through first end 210 of specimen 212. Second specimen mount 214 comprises bolt 242 extending through second end 218 of specimen 212. Bolt 240 and bolt 242 secure specimen 212 within sustained load fixture 202.

Second specimen mount 214 comprises threaded connector 244. Sustained load fixture 202 further comprises torque retention nut 246 connected to threaded connector 244. Torque retention nut 246 is configured to set distance 222 between far end 223 of inner housing 216 and first specimen mount 208. Torque retention nut 246 is used to capture and hold inner housing 216 at a level that mates with compression spring 204 when compression spring 204 is under compression 228. In some illustrative examples, securing inner housing 216 of sustained load fixture 202 comprises setting distance 222 to establish the known tension, tension 248, to be applied to specimen 212.

Sustained load fixture 202 is configured to maintain tension 248 on specimen 212 during transportation of sustained load fixture 202.

All energy is released from the sustained load fixture when specimen 212 fails. When specimen 212 fails, inner housing 216 can move downward and away from compression spring 204. After specimen 212 fails, compression spring 204 is no longer under compression 228. After specimen 212 fails, compression spring 204 no longer stores energy.

In some illustrative examples, sustained load fixture 202 can have a structural capacity of 10,000 lbs. In some illustrative examples, sustained load fixture 202 can be designed to withstand greater loads through choice of materials. The load, tension 248, applied to specimen 212 is modified by the amount of compression 228 applied to compression spring 204 and moving the position of torque retention nut 246. The load, tension 248, that can be applied to specimen 212 can be modified by changing compression spring 204 to another compression spring. A larger range of loads can be achieved by changing out compression spring 204 for a compression spring with a different spring constant.

Sustained load fixture 202 is configured to hold specimen 212 under tension 248 during environmental application 252. Environmental application 252 can be at least one of water, fuel, salt, heat, or any other desirable environmental factor to which a material may be exposed. In some illustrative examples, components of sustained load fixture 202 are formed of materials configured to be exposed to at least one of water, fuel, salt, or heat without corrosion. Reducing or preventing corrosion of components of sustained load fixture 202 by environmental application 252 can increase the longevity of sustained load fixture 202. Reducing or preventing corrosion of components of sustained load fixture 202 by environmental application 252 can reduce maintenance costs and time for sustained load fixture 202.

In some illustrative examples, components of sustained load fixture 202 are formed of at least one of aluminum 258 or steel 260. In some illustrative examples, parts made of aluminum 258 can be treated with Acid Anodize, followed by a primer and finished with a top coat. In some illustrative examples, the acid anodize is a Boric Sulfuric Acid Anodize (BCAA). The surface treatments will better protect the aluminum during harsh condition environments such as salt spray.

In some illustrative examples, parts made of aluminum 258 can be made from 5086 marine grade aluminum to reduce the use of protective coatings and cut down on manufacturing time. In some illustrative examples, at least one part in sustained load fixture 202 will be Stainless Steel.

In some illustrative examples, all components of sustained load fixture 202 can be fully coated with a primer and top coat combination to protect the components from environmental application 252. In some illustrative examples, only outer housing 206 and inner housing 216 are coated with primer 254 and top coat 256. In some illustrative examples, small parts of sustained load fixture 202, such as bolt 240, first specimen mount 208, and second specimen mount 214 will be made with material not requiring additional protection.

In using sustained load fixture 202, compression spring 204 is placed in compression 228. Inner housing 216 is moved upwards to contact compression spring 204. Torque retention nut 246 sets distance 222 to a specified value. The load is relaxed to zero, releasing compression 228 in compression spring 204 to transfer the force onto specimen 212.

Sustained load fixture 202 provides a single, easily verifiable load fixture. User induced variance in slack is reduced to consistently maintain desired load, tension 248. The load being sustained on specimen 212 after loading is at tension 248, which is a desired level.

In some illustrative examples, sustained load fixture 202 comprises force applicator 203; outer housing 206 surrounding force applicator 203; and inner housing 216. Inner housing 216 is within outer housing 206 and movable relative to outer housing 206 to place specimen 212 into tension 248 when force applicator 203 applies a force to inner housing 216. Specimen 212 is mounted to outer housing 206 and inner housing 216.

In some illustrative examples, sustained load fixture 202 is used to perform a method of applying a sustained tension load to specimen 212. Specimen 212 is secured on first specimen mount 208 and second specimen mount 214 of sustained load fixture 202. Inner housing 216 of sustained load fixture 202 is secured on second specimen mount 214 of sustained load fixture 202 to set distance 222 between far end 223 of inner housing 216 and first specimen mount 208 of sustained load fixture 202. Force 225 is applied to inner housing 216 using force applicator 203 within outer housing 206 of sustained load fixture 202 to change distance 222 between far end 223 of inner housing 216 and first specimen mount 208 of sustained load fixture 202.

The illustration of testing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, first specimen mount 208 can include other features in addition to block 238, pin 232, and bolt 240. In other illustrative examples, sustained load fixture 202 can be connected to load applying machine 250 by a component other than rod 230.

In some illustrative examples, a force washer transducer is positioned at an interface of force applicator 203 and inner housing 216. A force washer transducer can be used to quantify an amount of force 225 being applied.

Figure 3:
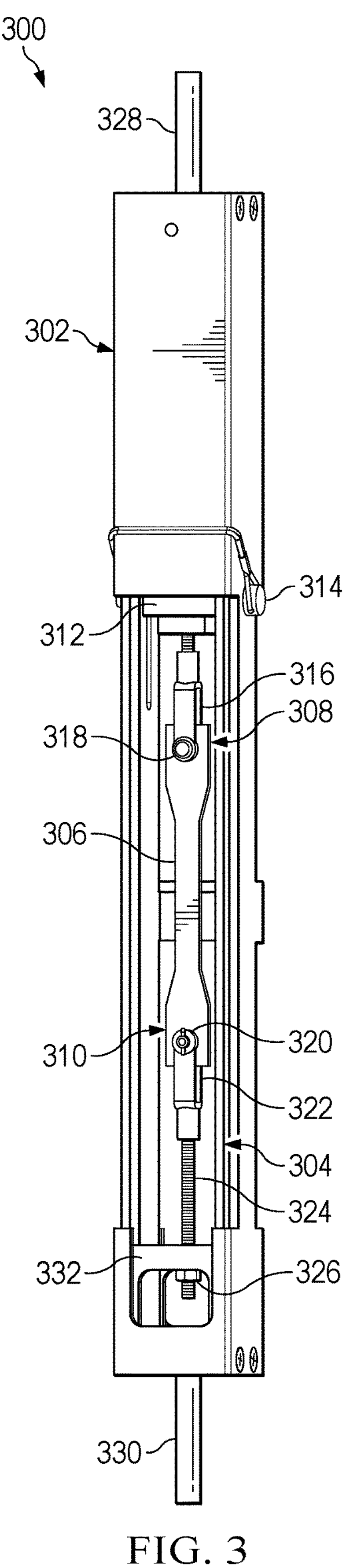
FIG. 3 is an illustration of an isometric view of a sustained load fixture in accordance with an illustrative embodiment.

Turning now to FIG. 3, an illustration of an isometric view of a sustained load fixture in accordance with an illustrative embodiment. Sustained load fixture 300 is a physical implementation of sustained load fixture 202 of FIG. 2.

Sustained load fixture 300 comprises a force applicator (not visible) within outer housing 302; first specimen mount 316 secured to outer housing 302 and configured to hold first end 308 of specimen 306 to be loaded; second specimen mount 322 secured to an inner housing 304 and configured to hold second end 310 of specimen 306 to be loaded; and inner housing 304 movable relative to outer housing 302 to set a distance between far end 332 of the inner housing 304 and first specimen mount 316. The force applicator is positioned to apply a force to inner housing 304 such that specimen 306 loaded in sustained load fixture 300 is placed into tension. The force applicator is positioned to apply a force to inner housing 304 to change a distance between far end 332 of inner housing 304 and first specimen mount 316 of sustained load fixture 300.

In this illustrative example, outer housing 302 surrounds the force applicator. In some illustrative examples, the force applicator can be a compression spring. By surrounding the compression spring, pinch points of sustained load fixture 300 are enclosed. Rod 328 is connected to a plunger (not visible) within outer housing 302. Rod 328 extends through outer housing 302. The plunger is configured to compress the compression spring against outer housing 302. In other illustrative examples, when the force applicator takes a different form, rod 328 may not be present. In other illustrative examples, when the force applicator takes a different form, an activator for the type of force applicator is present and can replace rod 328.

Rod 330 is connected to an opposite end of outer housing 302 than the plunger. Rod 330 can be used to load sustained load fixture 300 into a load applying machine for installation of specimen 306 and compression of the compression spring.

First specimen mount 316 comprises pin 314. Pin 314 restrains movement of first end 308 of specimen 306 relative to outer housing 302. Inner housing 304 is designed to move relative to pin 314 and outer housing 302.

First specimen mount 316 comprises bolt 318 extending through first end of specimen 306. Bolt 318 secures specimen 306 within sustained load fixture 300. Second specimen mount 322 comprises bolt 320 extending through second end 310 of specimen 306. Bolt 320 secures specimen 306 within sustained load fixture 300.

First specimen mount 316 maintains a position of first end 308 of specimen 306 relative to outer housing 302. Second end 310 of specimen 306 is connected to inner housing 304 of sustained load fixture 300, which is movable relative to outer housing 302. By moving inner housing 304 away from compression spring 402, tension is applied to specimen 306. By moving inner housing 304 towards rod 330, tension is applied to specimen 306. First specimen mount 316 comprises a pin 314 configured to secure specimen 306 to outer housing 302 and controls the movement of inner housing 304.

Second specimen mount 322 comprises threaded connector 324. Torque retention nut 326 is connected to threaded connector 324 and configured to set the distance between the far end of inner housing 304 and first specimen mount 316.

Sustained load fixture 300 is configured to maintain the tension on specimen 306 during transportation of sustained load fixture 300. All energy is released from the sustained load fixture 300 when specimen 306 fails.

Components of the sustained load fixture 300 are formed of materials configured to be exposed to at least one of water, fuel, salt, or heat without corrosion. In some illustrative examples, components of sustained load fixture 300 are formed of at least one of aluminum or steel. In some illustrative examples, components of sustained load fixture 300, such as at least one of outer housing 302 or inner housing 304 have a primer and outer coat applied to provide additional protection against at least one of water, fuel, salt, or heat.

Figure 4:
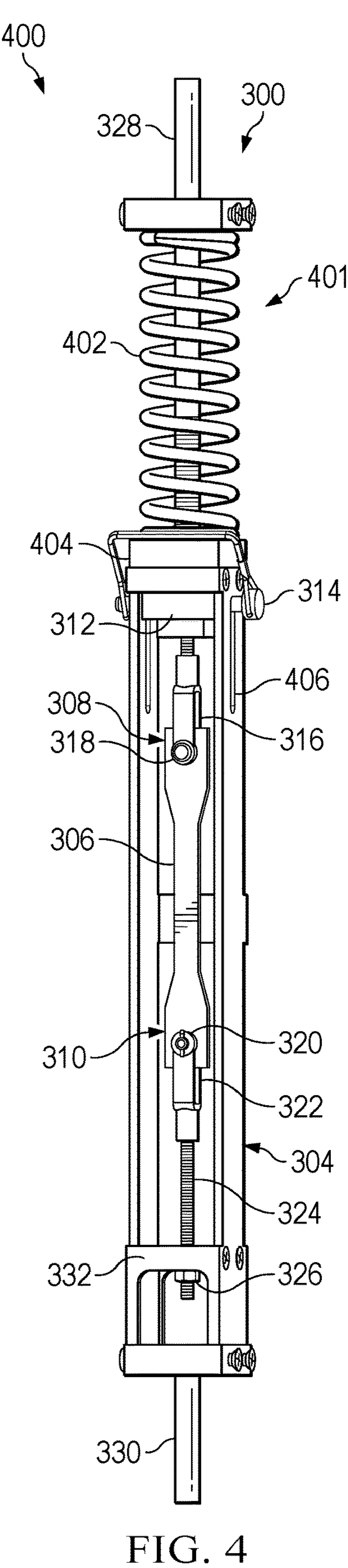
FIG. 4 is an illustration of an isometric view of a sustained load fixture in accordance with an illustrative embodiment.

Turning now to FIG. 4, an illustration of an isometric view of a sustained load fixture in accordance with an illustrative embodiment. In view 400 of sustained load fixture 300, the majority of outer housing 302 has been removed for explanation of functioning of compression spring 402 in sustained load fixture 300.

In view 400, force applicator 401 is visible. In this illustrative example, force applicator 401 takes the form of compression spring 402. Compression spring 402 is positioned between one end of outer housing 302 and plunger 404. Force applicator 401 is positioned to apply a force to inner housing 304 such that specimen 306 loaded in sustained load fixture 300 is placed into tension. In view 400 compression spring 402 is not storing any energy. View 400 can be a view of sustained load fixture 300 after specimen 306 is loaded into sustained load fixture 300. View 400 can be a view of sustained load fixture 300 prior to applying a tension to specimen 306.

Inner housing 304 of sustained load fixture 300 comprises slots 406. Slots 406 allow for movement of inner housing 304 relative to pin 314. First specimen mount 316 comprises pin 314 extending through slots 406 in inner housing 304 such that inner housing 304 is movable relative to pin 314.

Figure 5:
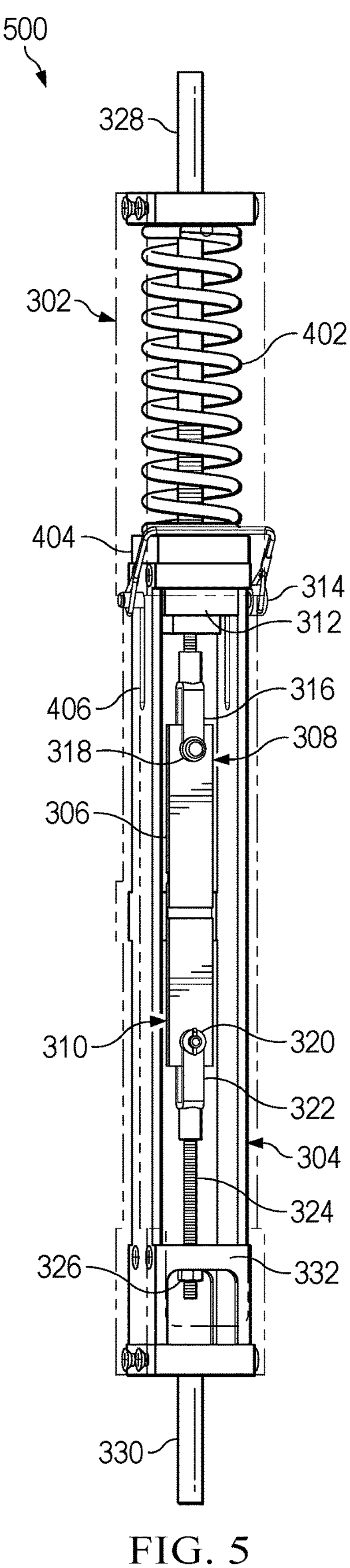
FIG. 5 is an illustration of an isometric view of a sustained load fixture in accordance with an illustrative embodiment.

Turning now to FIG. 5, an illustration of an isometric view of a sustained load fixture in accordance with an illustrative embodiment. In view 500 outer housing 302 is shown in phantom. In view 500, compression has been applied to compression spring 402. Between view 400 and 500, plunger 404 has been pulled away from inner housing 304. By pulling plunger 404 away from inner housing 304, compression spring 402 is compressed between plunger 404 and outer housing 302.

Rod 328 attached to plunger 404 can be pulled by any desirable type of load applying machine or tool. The load applying machine is configured to provide a desired amount of force.

Figure 6:
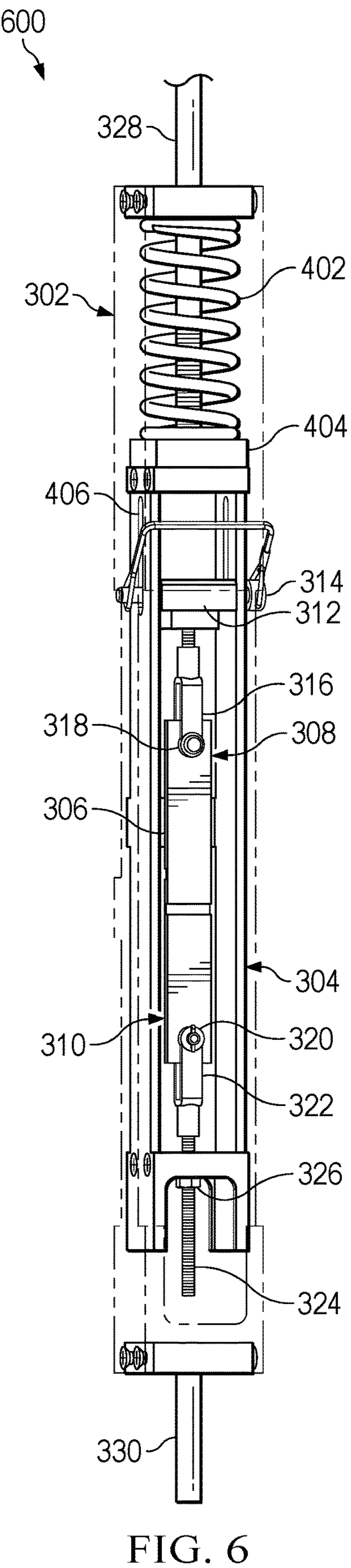
FIG. 6 is an illustration of an isometric view of a sustained load fixture in accordance with an illustrative embodiment.

Turning now to FIG. 6, an illustration of an isometric view of a sustained load fixture in accordance with an illustrative embodiment. In view 600, compression spring 402 has been released. By releasing compression spring 402, compression spring 402 applies a force onto inner housing 304 away from compression spring 402. In this illustrative example, compression spring 402 applies a force downward onto inner housing 304. By applying a force onto inner housing 304, inner housing 304 applies a known tension to specimen 306. Slots 406 in inner housing 304 allow inner housing 304 to move relative to first specimen mount 316. As inner housing 304 moves relative to first specimen mount 316, second specimen mount 322 pulls downward on specimen 306 to apply a known tension on specimen 306.

Sustained load fixture 300 can be positioned in any desirable load applying machine or tool during loading of specimen 306, compression of compression spring 402, movement of inner housing 304, and applying tension to specimen 306. During loading of specimen 306, compression of compression spring 402, and release of compression spring 402, sustained load fixture 300 is held in the load applying machine. The load applying machine can be of any desirable form. After releasing compression spring 402 and applying the tension to specimen 306, sustained load fixture 300 can be removed from the load applying machine or tool. Sustained load fixture 300 does not need to remain in the load applying machine while specimen 306 is under tension. Sustained load fixture 300 can be removed from the load applying machine and transported while specimen 306 is under tension. After removal from the load applying machine, sustained load fixture 300 maintains the tension on specimen 306. In some illustrative examples, sustained load fixture 300 can be referred to as a cartridge.

Although force applicator 401 is depicted as compression spring 402, compression spring 402 can be selected based on cost and availability. Compression spring 402 can be a commercially available and inexpensive part compared to other types of force applicators. Compression spring 402 can be selected based on its ability to withstand environmental conditions. Compression spring 402 maintains a known tension during application of heat, water, salt, and other environmental conditions. Compression spring 402 remains operable after application of heat, water, salt, and other environmental conditions.

In other non-depicted illustrative examples, force applicator 401 can be a different type of force applicator. In some illustrative examples, force applicator 401 is one of a hydraulic press or an inflatable bladder. In some illustrative examples, an inflatable bladder can be used under ambient conditions.

Figure 7B:
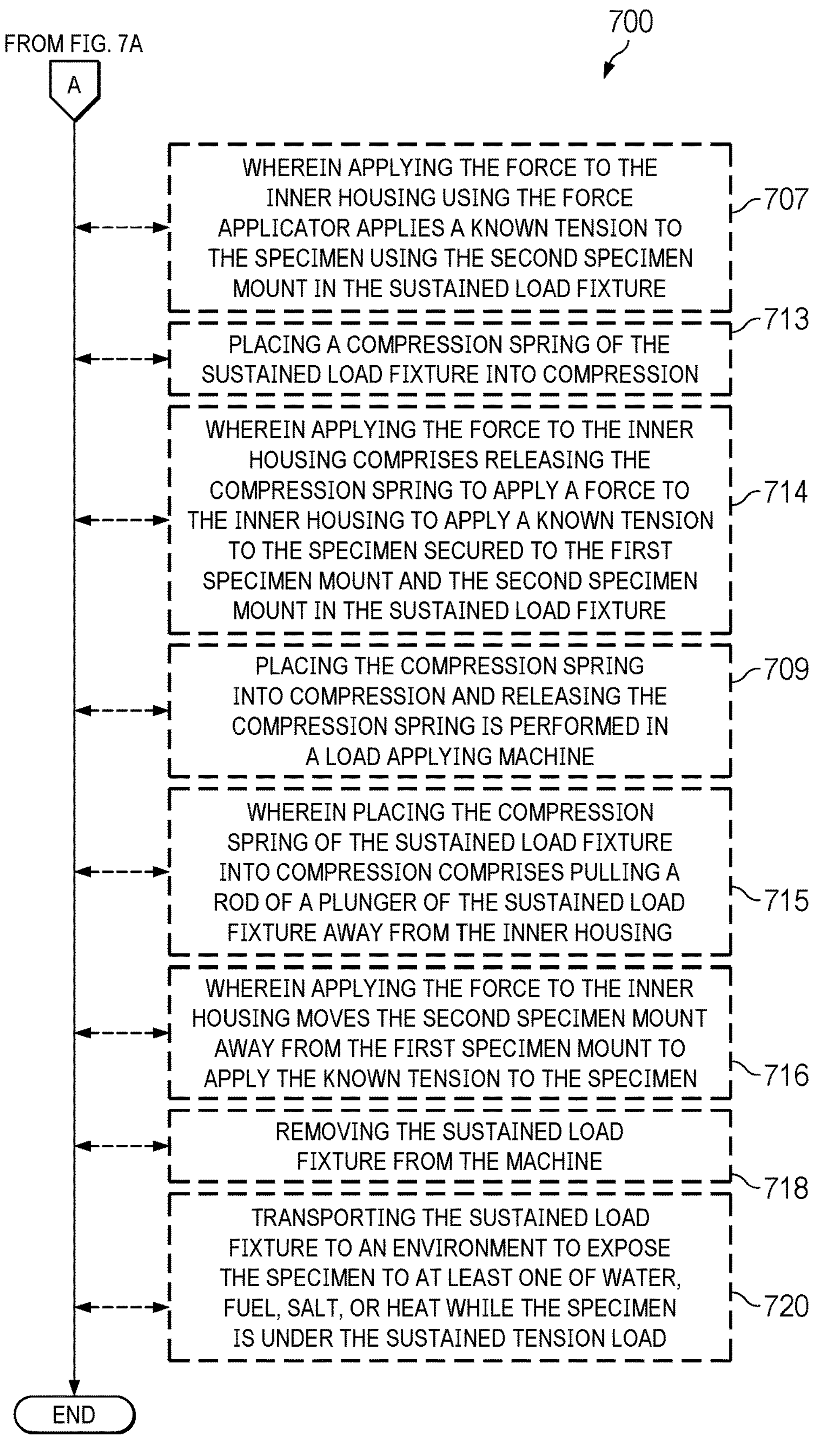

Turning now to FIGS. 7A and 7B, a flowchart of a method of applying a sustained tension load to a specimen in accordance with an illustrative embodiment. Method 700 can be used to test material specimens for portions of aircraft 100 of FIG. 1. Method 700 can be performed using sustained load fixture 202 of FIG. 2. Method 700 can be performed using sustained load fixture 300 of FIGS. 3-6.

Method 700 secures the specimen on a first specimen mount and a second specimen mount of a sustained load fixture (operation 702). Method 700 secures an inner housing of the sustained load fixture on a second specimen mount of the sustained load fixture to set a distance between a far end of the inner housing and a first specimen mount of the sustained load fixture (operation 704). Method 700 applies a force to the inner housing using a force applicator within an outer housing of the sustained load fixture to change the distance between the far end of the inner housing and the first specimen mount of the sustained load fixture (operation 706). Afterwards, method 700 terminates.

In some illustrative examples, applying the force to the inner housing using the force applicator applies a known tension to the specimen using the second specimen mount in the sustained load fixture (operation 707). The tension is applied to the specimen as the inner housing translates the force from the force applicator into the tension on the specimen. The force on the inner housing is a downward force relative to the first specimen mount to move the second specimen mount away from the first specimen mount.

The sustained load fixture is formed of any desirable material. In some illustrative examples, method 700 applies at least one of a primer or a top coat onto the outer housing and the inner housing prior to applying the sustained tension load to the specimen (operation 708). In some illustrative examples, the primer or the top coat is configured to provide additional resistance to water, fuel, salt, or heat for the outer housing and the inner housing. In some illustrative examples, the sustained load fixture comprises components formed of at least one of stainless steel or aluminum.

In some illustrative examples, method 700 places a compression spring of a sustained load fixture into compression (operation 713). By placing the compression spring into compression, the compression spring is loaded to apply a force to the inner housing. In some illustrative examples, releasing the compression spring applies a force to the inner housing.

In some illustrative examples, applying the force to the inner housing comprises releasing the compression spring to apply a force to the inner housing to apply a known tension to the specimen secured to the first specimen mount and the second specimen mount in the sustained load fixture (operation 714). In some illustrative examples, releasing the compression spring allows the compression spring to expand and press downward onto the inner housing.

In some illustrative examples, placing the compression spring of the sustained load fixture into compression comprises pulling a rod of a plunger of the sustained load fixture away from the inner housing (operation 715). In some illustrative examples, placing the compression spring of the sustained load fixture into compression comprises pulling a rod of a plunger of the sustained load fixture away from an outer housing surrounding the compression spring. In some illustrative examples, the rod of the plunger is pulled upward to place the compression spring into compression.

In some illustrative examples, applying the force to the inner housing moves the second specimen mount away from the first specimen mount to apply the known tension to the specimen (operation 716). In some illustrative examples, the known tension is set by the amount of compression applied to the compression spring and the set distance between the far end of the inner housing and the first specimen mount.

In some illustrative examples, securing the inner housing of the sustained load fixture on the second specimen mount comprises adjusting a torque retention nut connected to a threaded connector of the second specimen mount to set the distance between the far end of the inner housing and the first specimen mount (operation 710). In some illustrative examples, securing the inner housing of the sustained load fixture comprises setting the distance to establish the known tension to be applied to the specimen (operation 712).

In some illustrative examples, placing the compression spring into compression and releasing the compression spring is performed in a load applying machine (operation 709). The load applying machine can take any desirable form. The load applying machine holds the sustained load fixture during insertion of the specimen. The specimen can be secured within the sustained load fixture without any additional specialized equipment.

In some illustrative examples, method 700 removes the sustained load fixture from the load applying machine (operation 718). The specimen is maintained under the known tension while the sustained load fixture is removed from the load applying machine. The sustained load fixture is transported with the specimen under the known tension. In some illustrative examples, method 700 transports the sustained load fixture to an environment to expose the specimen to at least one of water, fuel, salt, or heat while the specimen is under the sustained tension load (operation 720). By exposing the specimen to at least one of water, fuel, salt, or heat, the specimen can be tested under environmental conditions while under tension.

Figure 8:
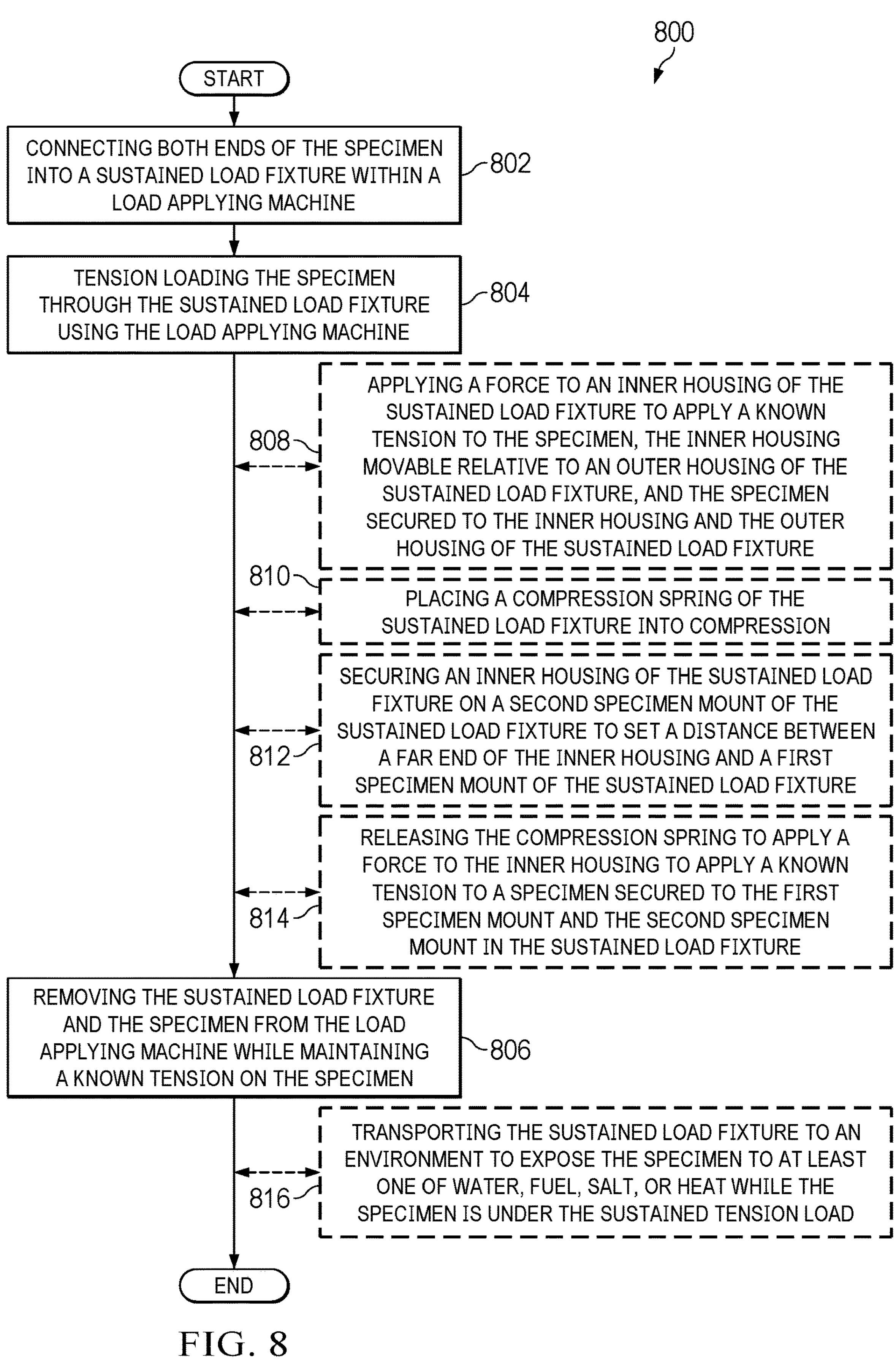
FIG. 8 is a flowchart of a method of applying a sustained tension load to a specimen in accordance with an illustrative embodiment.

Turning now to FIG. 8, a flowchart of a method of applying a sustained tension load to a specimen in accordance with an illustrative embodiment. Method 800 can be used to test material specimens for portions of aircraft 100 of FIG. 1. Method 800 can be performed using sustained load fixture 202 of FIG. 2. Method 800 can be performed using sustained load fixture 300 of FIGS. 3-6.

Method 800 connects both ends of the specimen into a sustained load fixture within a load applying machine (operation 802). Method 800 tension loads the specimen through the sustained load fixture using the load applying machine (operation 804). Method 800 removes the sustained load fixture and the specimen from the load applying machine while maintaining a known tension on the specimen (operation 806). Afterwards, method 800 terminates.

In some illustrative examples, tension loading the specimen through the sustained load fixture comprises applying a force to an inner housing of the sustained load fixture to apply a known tension to the specimen, the inner housing movable relative to an outer housing of the sustained load fixture, and the specimen secured to the inner housing and the outer housing of the sustained load fixture (operation 808). In these illustrative examples, applying a compression force to the inner housing applies a tension force to the specimen. In these illustrative examples, the force is applied to the end of the specimen attached to the inner housing, while the first end of the specimen remains mounted to the outer housing.

In some illustrative examples, the sustained load fixture comprises a compression spring configured to apply a force within the sustained load fixture to place the specimen in tension. In these illustrative examples, the load applying machine will apply compression to the compression spring to place a load into the sustained load fixture. In some illustrative examples, tension loading the specimen through the sustained load fixture comprises placing a compression spring of the sustained load fixture into compression (operation 810); securing an inner housing of the sustained load fixture on a second specimen mount of the sustained load fixture to set a distance between a far end of the inner housing and a first specimen mount of the sustained load fixture (operation 812); and releasing the compression spring to apply a force to the inner housing to apply a known tension to a specimen secured to the first specimen mount and the second specimen mount in the sustained load fixture (operation 814).

In some illustrative examples, method 800 transports the sustained load fixture to an environment to expose the specimen to at least one of water, fuel, salt, or heat while the specimen is under the sustained tension load (operation 816). In these illustrative examples, the specimen in the sustained load fixture is subjected to environmental conditioning. In these illustrative examples, the sustained load fixture is also subjected to the environmental conditioning. In these illustrative examples, the components of the sustained load fixture are selected and configured to withstand the environmental conditions without experiencing corrosion. In some illustrative examples, the materials selected are selected to withstand the environmental conditions without experiencing corrosion. In some illustrative examples, a force applicator of the sustained load fixture is selected to withstand the environmental conditions and remain functional.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 708 through operation 720 may be optional. As another example, operation 808 through operation 816 may be optional.

Figure 9:
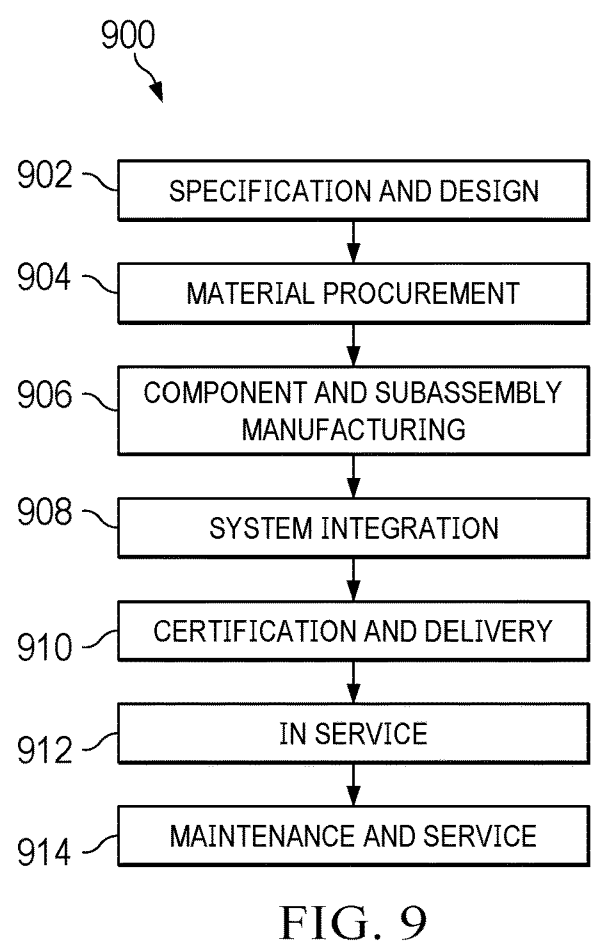
FIG. 9 is an illustration of an aircraft manufacturing and service method in a form of a block diagram in accordance with an illustrative embodiment.
Figure 10:
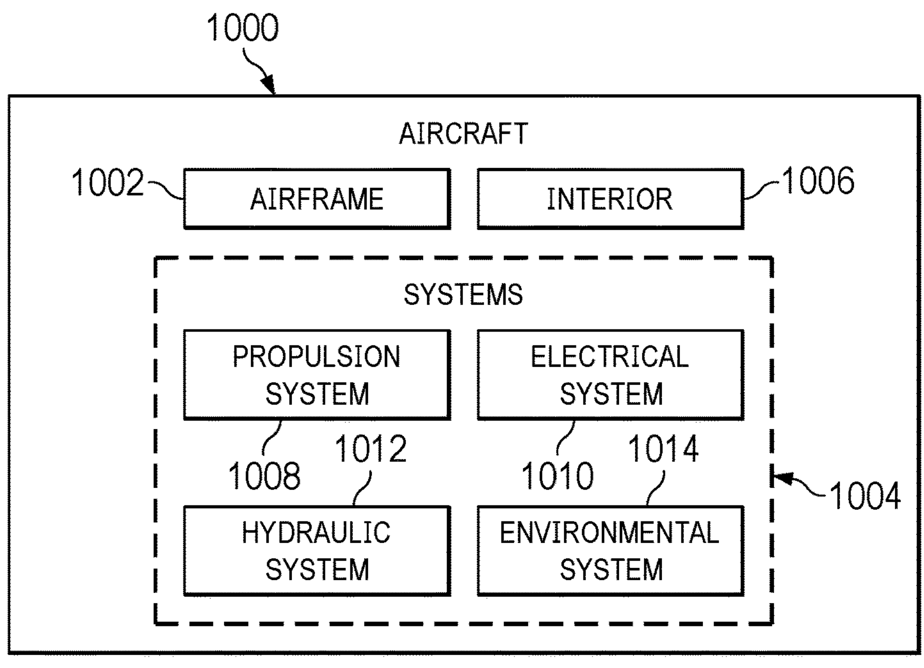
FIG. 10 is an illustration of an aircraft in a form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method in a form of a block diagram is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance and service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft in a form of a block diagram is depicted in which an illustrative embodiment may be implemented. In this example, aircraft 1000 is produced by aircraft manufacturing and service method 900 of FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included.

Apparatuses and methods embodied herein may be employed during at least one of the stages of aircraft manufacturing and service method 900. One or more illustrative embodiments may be manufactured or used during at least one of component and subassembly manufacturing 906, system integration 908, in service 912, or maintenance and service 914 of FIG. 9.

The illustrative examples provide a sustained tension load fixture and methods. The sustained load fixture provides a safe, accurate, and consistent fixture for applying a continuous tension to a test specimen.

The sustained load fixture provides a stable, one-piece tension load. The operation provides a one step load and unload procedure. A compression spring with a known load is used to apply tension to a specimen.

The sustained tension fixture provides a desired level of accuracy and consistency due to the use of a single verifiable spring and movable retention nut. The sustained load fixture provides an easily verifiable load fixture. The sustained tension fixture reduces user induced variance to consistently maintain desired load.

The sustained load fixture provides a consistent, repeatable process, verifiable load application, and appropriate materials to withstand environmental conditioning. Additionally, the design has a minimal number of parts that have to be replaced after conditioning due to corrosion. The parts can be formed of a material or treated with a material to withstand corrosion.

The illustrative examples present a method to test a load lap shear coupon under sustained tension. The load lap shear coupon test specimen is loaded into a sustained load fixture (test cartridge). By loading the lap shear coupon test specimen into the sustained load fixture, the specimen is connected to a preload spring. The sustained load fixture (cartridge) is loaded into a test machine. The spring connected to the test specimen within the sustained load fixture (cartridge) is preloaded to apply a tension load to the test specimen. The sustained load fixture (cartridge) with the test specimen is removed from the test machine while maintaining the spring load tension load on the test specimen. The spring load tension load on the test specimen is maintained for a time specified in specified environmental conditions.

Use of a compression spring as in the sustained load fixture reduces potential physical hazards presented to the operator. The compression spring is within an outer housing and is fully relaxed upon placing the specimen into tension.

The sustained load fixture is designed to be consistent, verifiable, and safe. The sustained load fixture is entirely self contained: the sustained load fixture does not require the use of additional fixture pieces to load and unload the specimens. Being self contained increases productivity and eliminates complications and risk.

The easy adjustability of the sustained load fixture allows for accurate manipulation of the load to produce consistent results. The design's simplicity makes the loading process easier and quicker to execute, thus speeding up productivity.

The sustained load fixture transfers a compression load into a tension load. The sustained load fixture captures the force of the spring and applies it to the specimen. A single point of adjustability in the sustained load fixture is used to dial in the load. Upon failure of the test coupon specimen as designed, the sustained load fixture will ensure that all pieces and potential energy are contained. The bolts hold specimen pieces in place. The outer housing surrounds the compression spring. The sustained load fixture provides sufficient design features for operation without additional external safety controls.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A sustained load fixture comprising:
- a force applicator within an outer housing;
- a first specimen mount secured to the outer housing and configured to hold a first end of a specimen to be loaded;
- a second specimen mount secured to an inner housing and configured to hold a second end of the specimen to be loaded, wherein the second specimen mount comprises a threaded connector;
- the inner housing movable relative to the outer housing to apply a tension to the specimen through the second specimen mount, the force applicator positioned to apply a force to the inner housing such that the inner housing translates the force from the force applicator into the tension on the specimen; and
- a torque retention nut connected to the threaded connector, wherein the torque retention nut is configured to set a distance between a far end of the inner housing and the first specimen mount.

2. The sustained load fixture of claim 1, wherein the force applicator is a compression spring.

3. The sustained load fixture of claim 2 further comprising:
- the outer housing surrounding the compression spring.

4. The sustained load fixture of claim 2 further comprising:
- a plunger within an outer housing, a rod connected to the plunger extending through the outer housing, the plunger configured to compress the compression spring against the outer housing.

5. The sustained load fixture of claim 4 further comprising:
- a rod connected to an opposite end of the outer housing than the plunger.

6. The sustained load fixture of claim 5, wherein the rod connected to the plunger and the rod connected to an opposite end of the outer housing are configured to interface with a load applying machine configured to place the compression spring into compression, and wherein the sustained load fixture is configured to maintain tension on the specimen when the sustained load fixture is removed from the load applying machine.

7. The sustained load fixture of claim 1, wherein the inner housing comprises slots, and wherein the first specimen mount comprises a pin extending through the slots in the inner housing such that the inner housing is movable relative to the pin.

8. The sustained load fixture of claim 1, wherein the first specimen mount comprises a bolt extending through the first end of the specimen, and wherein the second specimen mount comprises a bolt extending through the second end of the specimen.

9. The sustained load fixture of claim 1, wherein the sustained load fixture is configured to maintain tension on the specimen during transportation of the sustained load fixture.

10. The sustained load fixture of claim 1, wherein all energy is released from the sustained load fixture when the specimen fails.

11. The sustained load fixture of claim 1, wherein the first specimen mount comprises a pin configured to secure the specimen to the outer housing and controls movement of the inner housing.

12. The sustained load fixture of claim 1, wherein components of the sustained load fixture are formed of materials configured to be exposed to at least one of water, fuel, salt, or heat without corrosion.

13. The sustained load fixture of claim 1, wherein components of the sustained load fixture are formed of at least one of aluminum or steel.

14. A method of applying a sustained tension load to a specimen, the method comprising:
- securing the specimen on a first specimen mount and a second specimen mount of a sustained load fixture;
- securing an inner housing of the sustained load fixture on the second specimen mount of the sustained load fixture by adjusting a torque retention nut connected to a threaded connector of the second specimen mount to set a distance between a far end of the inner housing and the first specimen mount of the sustained load fixture; and
- applying a force to the inner housing using a force applicator within an outer housing of the sustained load fixture to change the distance between the far end of the inner housing and the first specimen mount of the sustained load fixture.

15. The method of claim 14, wherein applying the force to the inner housing using the force applicator applies a known tension to the specimen using the second specimen mount in the sustained load fixture.

16. The method of claim 15 further comprising:

placing a compression spring of the sustained load fixture into compression; and wherein applying the force to the inner housing comprises releasing the compression spring to apply a force to the inner housing to apply the known tension to the specimen secured to the first specimen mount and the second specimen mount in the sustained load fixture.

17. The method of claim 16, wherein placing the compression spring of the sustained load fixture into compression comprises pulling a rod of a plunger of the sustained load fixture away from an outer housing surrounding the compression spring.

18. The method of claim 16, wherein placing the compression spring into compression and releasing the compression spring is performed in a load applying machine further comprising:

removing the sustained load fixture from the load applying machine; and transporting the sustained load fixture to an environment to expose the specimen to at least one of water, fuel, salt, or heat while the specimen is under the sustained tension load.

19. The method of claim 15, wherein applying the force to the inner housing moves the second specimen mount away from the first specimen mount to apply the known tension to the specimen.

20. The method of claim 15, wherein adjusting the torque retention nut comprises setting the distance to establish the known tension to be applied to the specimen.

21. The method of claim 15 further comprising:

applying at least one of a primer or a top coat onto an outer housing and the inner housing prior to applying the sustained tension load to the specimen.

* * * * *